US008899116B2

(12) United States Patent
Ueberschlag et al.

(10) Patent No.: US 8,899,116 B2
(45) Date of Patent: Dec. 2, 2014

(54) REPLACEABLE ULTRASONIC TRANSDUCER FOR AN ULTRASONIC FLOW MEASURING DEVICE

(71) Applicant: Endress + Hauser Flowtec AG, Reinach (CH)

(72) Inventors: Pierre Ueberschlag, Saint-Louis (FR); Michael Bezdek, Aesch (CH); Andreas Berger, Hasel (DE)

(73) Assignee: Endress + Hauser Flowtec AG, Reinach (CH)

( * ) Notice: Subject to any disclaimer, the term of this patent is extended or adjusted under 35 U.S.C. 154(b) by 128 days.

(21) Appl. No.: 13/727,779

(22) Filed: Dec. 27, 2012

(65) Prior Publication Data

US 2013/0167654 A1    Jul. 4, 2013

(30) Foreign Application Priority Data

Dec. 29, 2011   (DE) .......................... 10 2011 090 080

(51) Int. Cl.
*G01F 1/20*   (2006.01)
*G01F 1/66*   (2006.01)
*G01F 15/18*  (2006.01)

(52) U.S. Cl.
CPC ............. *G01F 1/662* (2013.01); *G01F 15/18* (2013.01)
USPC ..................................... 73/861.18

(58) Field of Classification Search
USPC ........................... 73/861.18, 861.19
See application file for complete search history.

(56) References Cited

U.S. PATENT DOCUMENTS

| 3,960,018 | A | 6/1976 | Chang et al. |
|---|---|---|---|
| 8,127,613 | B2 | 3/2012 | van Klooster et al. |
| 2010/0011867 | A1 | 1/2010 | van Klooster et al. |
| 2010/0257942 | A1 | 10/2010 | Straub, Jr. et al. |
| 2012/0125121 | A1 | 5/2012 | Gottlieb et al. |
| 2013/0205904 | A1* | 8/2013 | Ueberschlag et al. ......... 73/644 |

FOREIGN PATENT DOCUMENTS

| DE | 44 43 415 A1 | 6/1996 |
|---|---|---|
| DE | 20 2008 003 584 U1 | 9/2009 |
| DE | 10 2009 032 809 A1 | 9/2010 |
| WO | 88/03691 A1 | 5/1988 |
| WO | 96/18181 A1 | 6/1996 |
| WO | 2008/079014 A2 | 7/2008 |

OTHER PUBLICATIONS

German Search Report issued in corresponding Application No. 10 2011 090 080.2, dated Aug. 14, 2012.
International Search Report issued in corresponding Application No. PCT/EP2012/073387, dated Jan. 30, 2013.

* cited by examiner

*Primary Examiner* — Jewel V Thompson
(74) *Attorney, Agent, or Firm* — Bacon & Thomas, PLLC

(57) ABSTRACT

An ultrasonic transducer for an ultrasonic flow measuring device, comprising a first housing part and a second housing part. The second housing part is axially guided in the first housing part and is so biased relative to the first housing part that, in a first state of the ultrasonic transducer, a first axial stop of the second housing part rests on a first axial stop of the first housing part, wherein, by applying, counter to the bias, a predetermined force on a second axial stop of the second housing part, the second housing part is axially shiftable, so that, in a second state of the ultrasonic transducer, the first axial stop of the second housing part is moved out of the first state.

12 Claims, 1 Drawing Sheet

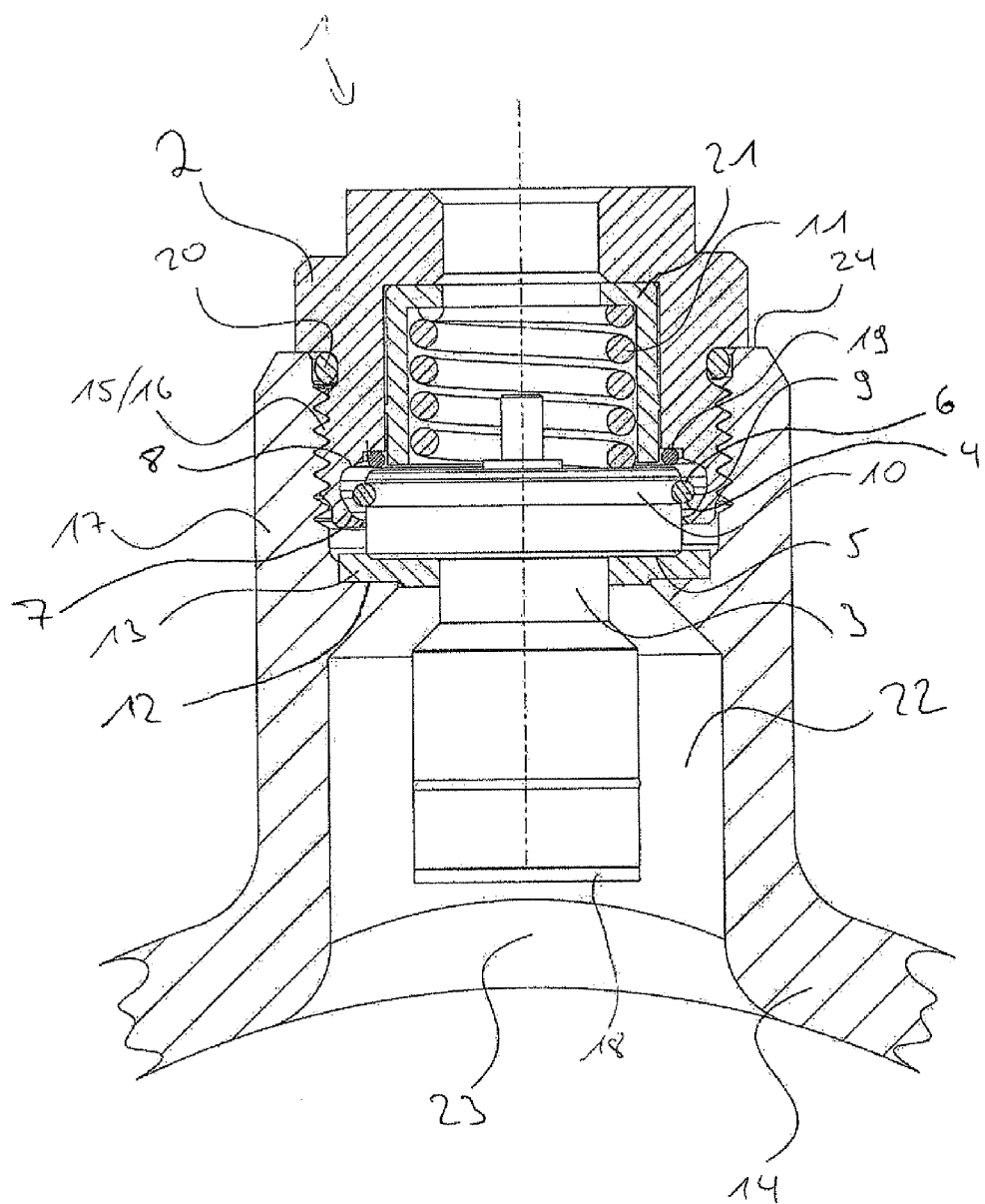

REPLACEABLE ULTRASONIC TRANSDUCER FOR AN ULTRASONIC FLOW MEASURING DEVICE

TECHNICAL FIELD

The present invention relates to a replaceable ultrasonic transducer for an ultrasonic flow measuring device.

BACKGROUND DISCUSSION

Ultrasonic flow measuring devices are applied often in process- and automation technology. They permit simple determination of volume flow and/or mass flow in a pipeline.

Known ultrasonic flow measuring devices frequently work according to the travel-time difference principle. According to this principle, the different travel times of ultrasonic waves, especially ultrasonic pulses, so-called bursts, are evaluated relative to the flow direction of the fluid. For this, ultrasonic pulses are sent at a certain angle to the tube axis both with the flow as well as also counter thereto. From the travel-time difference, the flow velocity and therewith, in the case of known diameter of the pipeline section, the volume flow can be determined.

The ultrasonic waves are produced, respectively received, with the aid of so-called ultrasonic transducers. For this, ultrasonic transducers are mounted in the tube wall of the relevant pipeline section. The ultrasonic transducers are, normally, composed of an electromechanical transducer element, e.g. a piezoelectric element, and an ultrasonic window. The ultrasonic waves are produced as acoustic signals in the electromechanical transducer element and led to the ultrasonic window and from there in-coupled into the fluid, or measured medium. The ultrasonic window is also referred to as a membrane.

Between the piezoelectric element and the ultrasonic window, a so called adapting, or matching, layer can be arranged. The adapting, or matching, layer performs, in such case, the function of transmission of the ultrasonic signal and simultaneously the reduction of a reflection on interfaces between two materials caused by differing acoustic impedances.

SUMMARY OF THE INVENTION

An object of the invention is to provide an ultrasonic transducer suitable for measuring gas flow.

The object is achieved by the ultrasonic transducer of the invention which includes a first housing part and a second housing part, wherein the second housing part is axially guided in the first housing part. Especially, the first housing part radially surrounds the second housing part, especially the two are coaxially arranged relative to one another, and the first housing part allows movements in the axial direction of the second housing part relative to the first housing part in predetermined measure. Movements perpendicular to a longitudinal axis of the second housing part, respectively to the axis along which the second housing part is axially shiftable, are not permitted by such an engagement. Rotational movements around such axis can be enabled.

Furthermore, the second housing part is biased relative to the first housing part, especially by means of a spring, especially a compression spring, for example, a compression coil spring.

The bias is such that, in a first state of the ultrasonic transducer, a first axial stop of the second housing part rests on a first axial stop of the first housing part. For example, the compression spring between first and second housing parts exerts a force on the second housing part, so that the second housing part of the ultrasonic transducer is pressed against the first axial stop of the first housing part. In a first state, for example, in the unmounted state of the ultrasonic transducer, in which no forces from the outside of the ultrasonic transducer at on it, the first axial stop of the second housing part lies on the first axial stop of the first housing part in a first rest position.

If the ultrasonic transducer is mounted in a bore in the wall of a pipeline of the invention for a ultrasonic flow measuring device of the invention, the first housing part is connected with the wall of the pipeline using a force- and/or shape-interlocking securement and the second axial stop of the second housing part is supports on a shoulder protruding into the bore. The shoulder serves as an axial stop, so that the predetermined force is applied via the shoulder onto the second housing part counter to the bias, in order to move the second housing part of the ultrasonic transducer out of the first state. The force acting on the second axial stop of the second housing part effects an axial shifting of the second housing part relative to the first housing part against the bias and out of the first rest position. In a second state of the ultrasonic transducer, the first axial stop of the second housing part is free of contact by the first stop of the first housing part and free of force acting on it counter to the bias.

In a further development of the invention, the second housing part of the ultrasonic transducer includes a third axial stop acting with opposite sense to that of the first axial stop. Both the first axial stop and the third axial stop are arranged between the first axial stop of the first housing part and a second axial stop of the first housing part acting with opposite sense to that of the first axial stop. By applying the predetermined force on the second housing part counter to the bias, the second housing part is axially shiftable, until, in a third state of the ultrasonic transducer, the third axial stop of the second housing part rests on the second axial stop of the first housing part in a second rest position.

In an additional further development of the ultrasonic transducer of the invention, the second housing part includes a two-sided acting, first axial stop instead of the first and separate third axial stops. For example, the second housing part includes a groove, in which a retaining ring is arranged as the two-sided acting, first axial stop.

Another further development of the invention provides that the second axial stop of the second housing part is embodied as a sealing surface on a periphery of the second housing part for fluid tight insertion of the ultrasonic transducer into a bore in a wall of a pipeline. In the above example, the force- and/or shape interlocking securement of the first housing part with the pipeline via the shoulder of the pipeline applies a bias to second axial stop lying outwardly peripherally around the second housing part and embodied as a sealing surface, in order to seal off the pipeline between the sealing surface and the shoulder.

In further developments, the ultrasonic transducer can have other seals, especially between the first housing part and the second housing part, in order to seal off the second housing part from the first housing part, for which purpose, for example, an O-ring is provided, or between the first housing part and the pipeline, in order to prevent fluid in the pipeline from escaping between the first housing part and the pipeline. Also, for this, an O-ring is used, for example.

For the already mentioned force- and/or shape-interlocking securement of the first housing part with the wall of the pipeline, the first housing part has an interface, which is embodied to be complementary to an interface of the pipeline. Thus, according to a further development of the ultrasonic flow measuring device of the invention, the first housing part has an external thread as an interface for releasable connection to an internal thread as a complementarily embodied interface of the pipeline, wherein the first housing part can be screwed into the bore of the pipeline. In this way, the mentioned pressing of the second axial stop of the second housing part against the shoulder of the pipeline can be implemented, in order, on the one hand, to shift the second housing part axially and in order, on the other hand, to seal the pipeline from the ultrasonic transducer.

In order to replace the ultrasonic transducer, it is provided according to an additional further development that the first housing part has another, second interface for the replacement of the ultrasonic transducer, for example, a hexagonal section, in order that the first housing part can be gripped by means of an apparatus, for example, a retractable assembly.

The second housing part surrounds an electromechanical transducer element, for example, a piezoelectric element, which is arranged on an ultrasonic window of the second housing part. Especially, the electromechanical transducer element is biased with suitable means, for example, a compression spring, against the ultrasonic window.

The ultrasonic window functions, in such case, for example, as an electrode for exciting the electromechanical transducer element, and for withdrawing electrical signals, via the second housing part. In such case, the ultrasonic transducer is especially so embodied that the first housing part is electrically insulated from the second housing part, at least in the second state, thus between the first and second rest positions. Especially, the first housing part includes an electrically non-conducting cage, for example, of a polymer, which surrounds the compression spring and in which the compression spring is guided and which the compression spring contacts exclusively of the first housing part.

In a further development of the ultrasonic transducer of the invention, the second housing part includes an ultrasonic window and thereto adjoining, rotationally symmetric walls, wherein there adjoins on the walls of the second housing part a first ring constructed coaxially to the walls and serving as resonator, which forms an end of the second housing part.

Another further development of the invention includes the feature that a function of the distance of each section edge of an outer contour of the second housing part to a longitudinal axis of the second housing part is monotonic from the ultrasonic window up to the third axial stop, wherein each section edge lies in a plane, in which the longitudinal axis of the second housing part lies.

BRIEF DESCRIPTION OF THE DRAWINGS

The invention can be embodied in numerous ways. Some of these will now be explained in greater detail based on the figures of the drawing. Equal elements are provided in the figures with equal reference characters. The figures of the drawing show as follows:

FIG. 1 is a sectional view of an ultrasonic transducer of the invention.

DETAILED DISCUSSION IN CONJUNCTION WITH THE DRAWINGS

FIG. 1 shows an ultrasonic transducer 1 of the invention in section. The ultrasonic transducer 1 of the invention includes a first housing part 2 and second housing part 3, which is seated axially arranged in the first housing part 2. The second housing part 3 includes a retaining ring 9 in the form of a bidirectionally acting, axial stop. This performs the functions of a first and a third axial stop 4 and 6. Here a peripheral annular groove 10 in the second housing part 3 extending coaxially with the outer contour of the second housing part 3 seats the retaining ring 9, which protrudes out from the annular groove 10. The retaining ring 9 as first and third axial stops 4 and 6 is located between a first axial stop 7 and a second axial stop 8 of the first housing part 2. Second axial stop 8 acts with sense opposite that of the first axial stop 7 of the first housing part 2.

Thus, the second housing part 3 is axially shiftable relative to the first housing part 2 between a first state, where the first axial stop 4 of the second housing part 3 rests on the first axial stop 7 of the first housing part 2, and a third state, where the third axial stop 6 of the second housing part 3 rests on the second axial stop 8 of the first housing part 2. Illustrated here is a second state, where the first and third axial stops 4 and 6 of the second housing part 3 are located, free of force, between the first and second axial stops 7 and 8 of the first housing part 2. The retaining ring 9 is not in contact with either of the stops 7 and 8 of the first housing part 2.

This state is reached by so arranging a compression coil spring 11 between first and second housing parts 2 and 3 that the second housing part 3 is so biased relative to the first housing part 2 that, in an externally force free first state, the first axial stop 4 of the second housing part 3 rests on the first axial stop 7 of the first housing part 2, and by providing a second axial stop 5 on the second housing part 3, on which a force directed counter to the bias can be applied and is applied. The second axial stop 5 is, in such case, coaxially peripherally embodied and serves as a sealing surface against an additional axial stop 12 of an interface 17 of the pipeline 14, against which the second axial stop 5 of the second housing part 3 lies and via which force is introduced into the second axial stop 5. By the forcing of the second housing part 3 toward the first housing part 2, a seal 13 between the stops 5 and 12 is compressed and seals, consequently, between pipeline 14 and ultrasonic transducer 1, so that no fluid located in the pipeline 14 can escape from it. Alternatively to said compression coil spring 11, also any other suitable means for biasing the second housing part 3 relative to the first housing part 2 can be used. The axial stop 12 of the interface 17 of the pipeline 14 is here formed by a shoulder 12 protruding into a bore 22, in which the ultrasonic transducer 1 is mounted into the pipeline 14. Here, the bore 22 is provided in a connection 17 of the pipeline 14 adapted to serve as the interface. Alternatively, also a casing or any other suitable interface can be secured on the pipeline 14 and the ultrasonic transducer 1 mounted therein, against an axial stop 12 thereof.

Especially, interface 17 has an internal thread 15 and the first housing part 2 a thereto complementary, external thread 16, for releasable securement of the ultrasonic transducer 1 to the pipeline 14. A screwed securement is a force- and a shape interlocking connection. Alternatively, however, options also include only a force-, or a shape, interlocking connection. For example, the ultrasonic transducer 1 is just inserted and pressed against the pipeline 14 with a means suitable therefor.

Ultrasonic transducer 1 includes in the second housing part 3, furthermore, an ultrasonic window 18, on which an electromechanical transducer element is arranged, for example, biased against such. Advantageously, the outer surface of the ultrasonic transducer is smooth and a function of the distance of each section edge of an outer contour of the second housing part to a longitudinal axis of the second housing part is, thus, monotonic from the ultrasonic window up to the third axial stop, wherein each section edge lies in a plane, in which the longitudinal axis of the second housing part lies.

Other seals can be provided. Thus, there is provided here a first O-ring 19 between the first and second housing parts 2 and 3, in order to seal these relative to one another. A second O-ring 20 is located in the shown variant of the ultrasonic transducer 1 between the first housing part 2 and the connection 17, above the threads as viewed from the lumen 23 of the pipeline. The first housing part 2 is screwed into the connection 17, until it comes to rest on the shoulder 24, whereby the O-ring 20 is compressed with a predetermined force.

The compression coil spring 11 is guided in an electrically non-conducting cage 21, for example, of a polymer, in the first housing part 2. Cage 21 serves also for the acoustic decoupling of the two housing parts.

The invention claimed is:

1. An ultrasonic transducer for an ultrasonic flow measuring device, comprising:
   a first housing part; and
   a second housing part, wherein:
   said second housing part is axially guided in said first housing part and is so biased relative to said first housing part that, in a first state of the ultrasonic transducer, a first axial stop of said second housing part rests on a first axial stop of said first housing part; and
   by applying, counter to the bias, a predetermined force on a second axial stop of said second housing part, said second housing part is axially shiftable, so that, in a second state of the ultrasonic transducer, said first axial stop of said second housing part is moved out of the first state.

2. The ultrasonic transducer as claimed in claim 1, characterized wherein:
   said second axial stop of said second housing part is embodied as a sealing surface on a periphery of said second housing part.

3. The ultrasonic transducer as claimed in claim 1, wherein:
   said second housing part also has a third axial stop acting in an opposite sense to that of said first axial stop, which are arranged between said first axial stop of said first housing part and a second axial stop of said first housing part acting in a sense opposite to that of said first axial stop of said first housing part; and
   by applying a predetermined force on said second housing part counter to the bias, said second housing part is axially shiftable, until, in an additional state of the ultrasonic transducer, said third axial stop of said second housing part rests on said second axial stop of said first housing part.

4. The ultrasonic transducer as claimed in claim 1, wherein:
   said second housing part has a groove, in which a retaining ring is arranged as a two-sided acting, first and third axial stop.

5. The ultrasonic transducer as claimed in claim 1, further comprising:
   a first seal, which is arranged between said first housing part and said second housing part, in order to seal said second housing part from said first housing part.

6. The ultrasonic transducer as claimed in claim 1, wherein:
   a function of the distance of each section edge of an outer contour of said second housing part to a longitudinal axis of said second housing part is monotonic from an ultrasonic window up to said third axial stop; and
   each section edge lies in a plane, in which the longitudinal axis of said second housing part lies.

7. The ultrasonic transducer as claimed in claim 1, wherein:
   first housing part has an interface for releasable connection with a complementarily embodied interface of a pipeline.

8. The ultrasonic transducer as claimed in claim 1, wherein:
   said second housing part has an ultrasonic window, on which an electromechanical transducer element is arranged.

9. The ultrasonic transducer as claimed in claim 8, wherein:
   said second housing part has rotationally symmetric walls, which connect to said ultrasonic window;
   there adjoins on the walls of said second housing part a first ring constructed coaxially to the walls of said second housing part; and
   said first ring serves as a resonator and forms an end of said second housing part.

10. The ultrasonic flow measuring device with an ultrasonic transducer as claimed in claim 1 and a pipeline, wherein:
    the ultrasonic transducer is so arranged in a bore in a wall of the pipeline that said first housing part is connected with the wall of the pipeline by force-and/or shape interlocking, and said second axial stop of said second housing part rests on a pipeline shoulder, which protrudes into said bore, so that the predetermined force is applied to said second housing part counter to the bias.

11. The ultrasonic flow measuring device as claimed in claim 10, wherein:
    said second stop of said second housing part is embodied as a sealing surface on a periphery of said second housing part and rests on a shoulder of the pipeline, which protrudes inwardly into said bore; and
    said second stop of said second housing part is biased against said shoulder.

12. The ultrasonic flow measuring device as claimed in claim 10, wherein:
    first housing part has an external thread as an interface for releasable connection with an internal thread as complementarily embodied interface of the pipeline; and
    said first housing part is screwed into the pipeline.

* * * * *